Nov. 11, 1952 — J. W. GRENIER — 2,617,659
STEERING APPARATUS FOR SLEDS
Filed Sept. 2, 1949 — 3 Sheets-Sheet 1
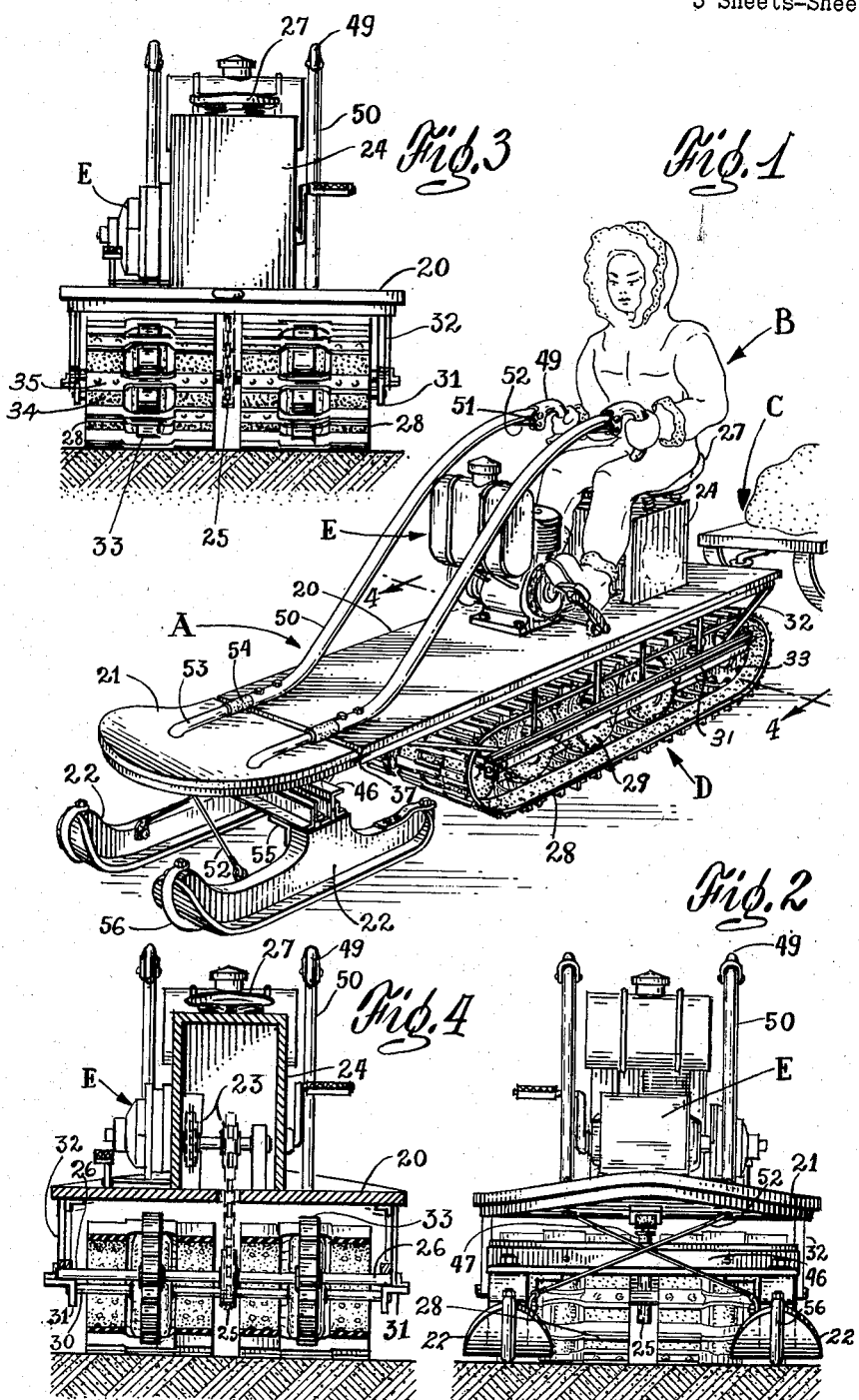
Inventor
Joseph Wilfrid Grenier
Attorneys

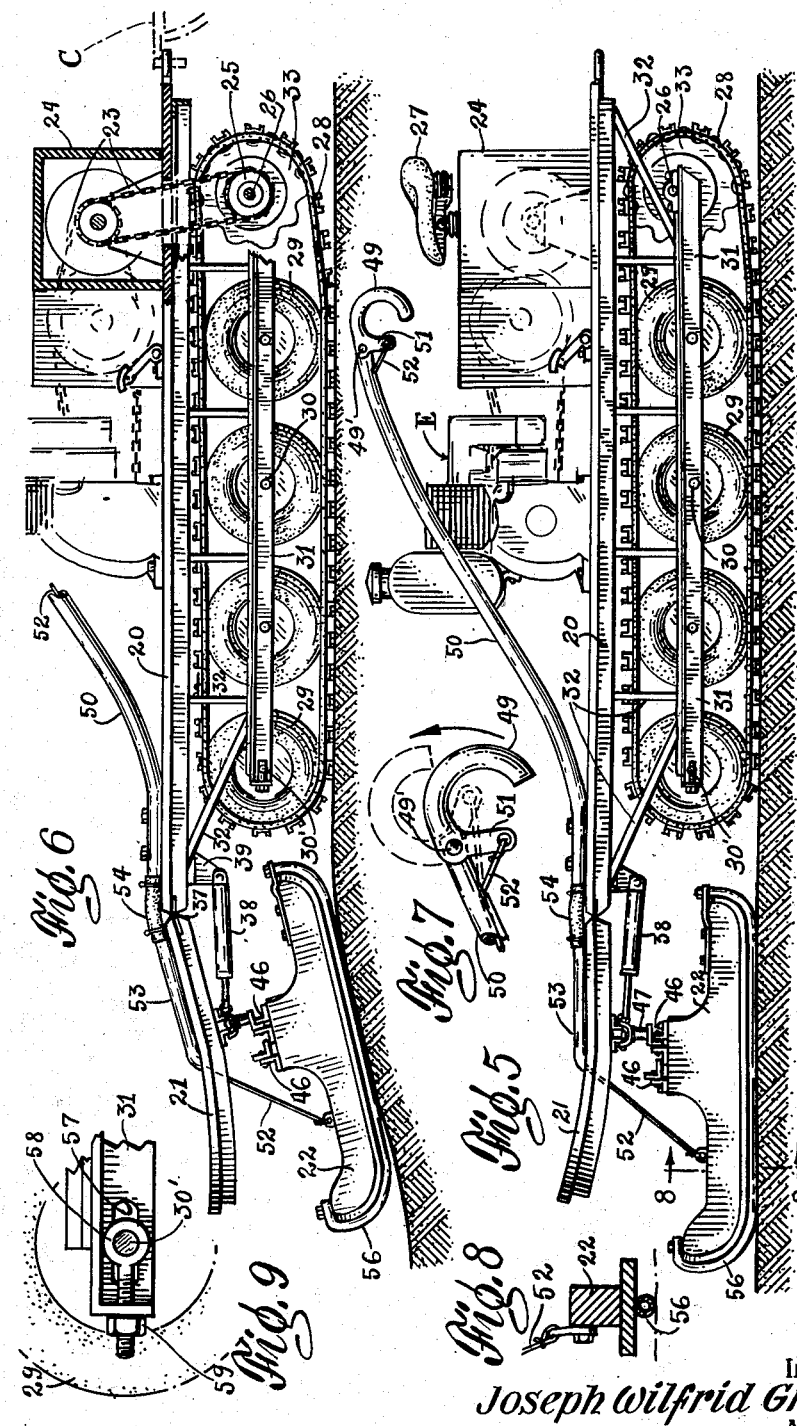

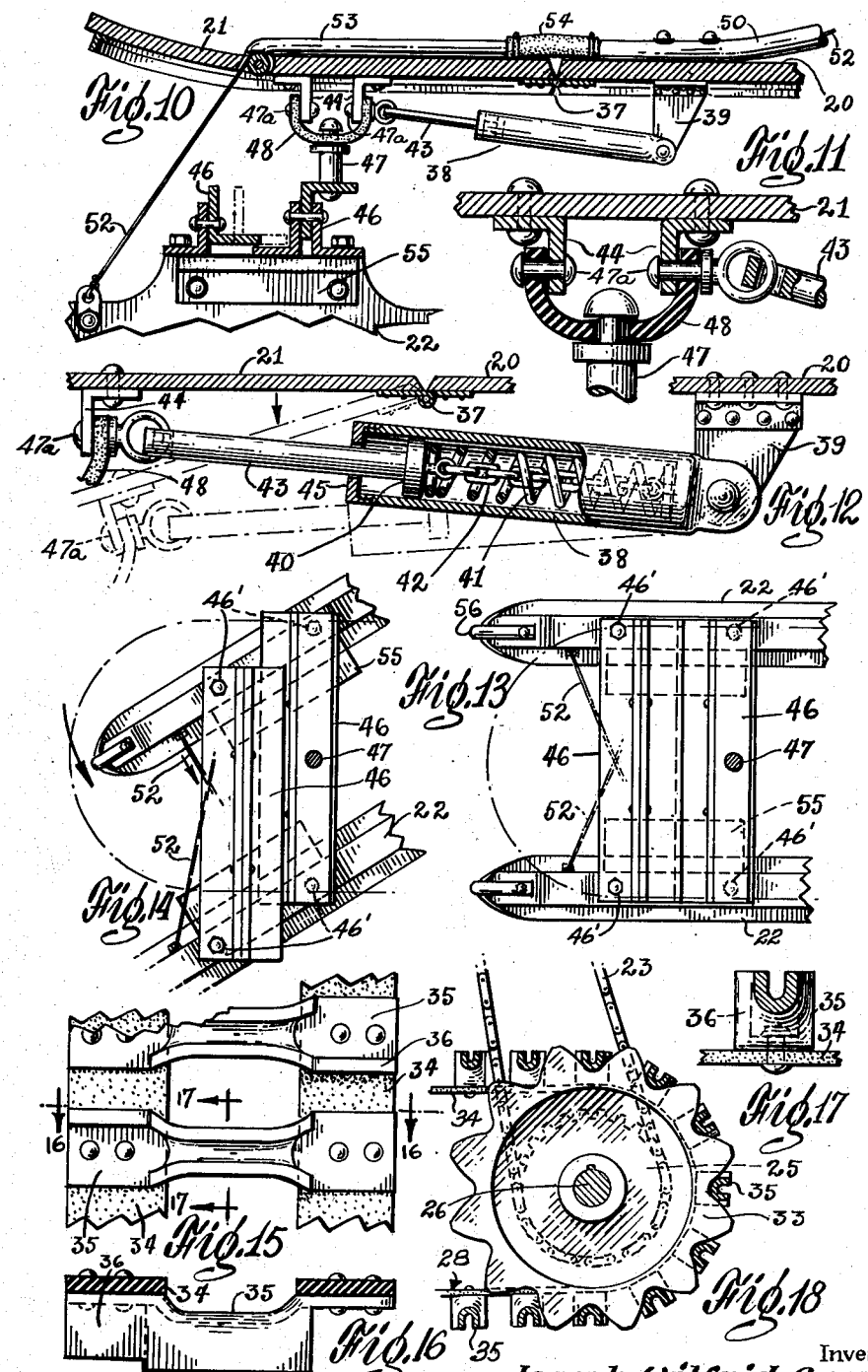

Patented Nov. 11, 1952

2,617,659

UNITED STATES PATENT OFFICE 2,617,659

STEERING APPARATUS FOR SLEDS

Joseph Wilfrid Grenier, Giffard,
Quebec, Canada

Application September 2, 1949, Serial No. 113,745

2 Claims. (Cl. 280—21)

The present invention relates to endless-track traction vehicles and more particularly to an endless-track snowmobile to be used as a prime mover for sleighs.

In snow covered areas, considerable use is made of dog-sleighs resulting in a very limited service in the matter of speed and endurance, as compared to a mechanical prime mover.

Accordingly the main object of the present invention is to provide a motor vehicle specially adapted for traction of dog sleighs over snow covered areas.

Another object of the present invention is to provide considerably improved means for load moving over snow covered areas.

Another important object of the present invention is the provision of means in a snowmobile whereby it cannot become snowbound.

Still another important object of this invention contemplates a snowmobile of such dimensions and weight as to be easily handled in narrow trails and easily lifted by hand over obstacles.

A further objection of the present invention is the provision in a vehicle of the character described, of flexible means to negotiate a rough terrain in a smooth and easy manner.

Still a further object of the present invention is to provide driving means for a snowmobile which may be easily understood and handled by dog or horse drivers.

Another object envisages a vehicle of the character described which is simple, rugged, reliable and relatively inexpensive to manufacture.

The foregoing and other important objects of the present invention will become apparent during the description to follow.

As a non-limitative example, and for purposes of illustration only, an embodiment of the invention is shown in the annexed drawings wherein:

Figure 1 is a perspective view of the vehicle of the invention;

Figure 2 is a front elevation of the same;

Figure 3 is a rear elevation of the same;

Figure 4 is a sectional elevation along line 4—4 of Figure 1;

Figure 5 is a side elevation of the snowmobile;

Figure 6 is similar to Figure 5 showing how the front portion of the vehicle is pivotable to suit the terrain and showing the rear of the vehicle in section;

Figure 7 is a detailed side elevation of a driving handle;

Figure 8 is a section along line 8—8 of Figure 5;

Figure 9 is a detailed view of an adjustable front wheel of the wheel train;

Figure 10 is a longitudinal fractional section of the front part of the vehicle;

Figure 11 is an enlarged section of the linkage of the ski train to the vehicle;

Figure 12 is a partly sectional side view of the shock absorber shown in Figure 10;

Figure 13 is a plan view of the ski train taken just below the linkage of the same to the vehicle;

Figure 14 is a view similar to Figure 13 showing the ski train in position for a turn;

Figure 15 is a plan view of a portion of a track;

Figure 16 is a section along line 16—16 of Figure 15;

Figure 17 is a section along line 17—17 of Figure 15;

Figure 18 is an elevation of one of the driving spur wheels, showing the track in section.

Referring to the drawings, wherein similar reference characters represent corresponding parts throughout, the vehicle, generally indicated by A in Figure 1 is driven by a driver B and pulls a sleigh partly shown at C.

The vehicle of the invention comprises a rectangular platform 20 mounted over the traction means generally indicated by D and supporting a conventional gas engine E.

To the front edge of the platform 20 is hingedly secured for vertical arcuate movement a front section 21 to which is hingedly secured a pair of skis 22 in a manner described hereafter.

The gas engine E, provided with suitable transmission means, drives through suitable chains and sprocket wheels 23 housed in a gear box 24, a sprocket wheel 25 centrally secured to the propelling axle 26 at the rear of the vehicle.

A driver's seat 27 is fastened to the top of said gear box 24 behind the engine, at the rear of the vehicle. Thus the weight of the vehicle and of the driver is mainly located over the tracks for added traction and turning ease, and for lessened danger of the vehicle front becoming snowbound.

The traction means consists in a pair of tracks 28 laid over a plurality of pairs of supporting wheels 29 provided with rubber tires and freely mounted on parallel cross axles 30. These axles 30 are fixed at both ends to two parallel beams 31 secured to the bottom of the platform 20 by means of tie bars 32.

The tracks 28 are driven by engaging a pair of spur wheels 33 secured to the common propelling axle 26. These spur wheels 33 have a slightly smaller diameter than the supporting wheels 29, while their axle 26 is carried on top of the beams 31 to normally prevent the contact of said spur wheels with the ground for longer life.

The tracks themselves comprise two parallel endless flexible belts 34 preferably made of rubber and held together by a plurality of arched elements 35 suitably spaced for engagement of the spur wheel teeth (see Figures 15–18). These elements 35 have a U-shaped cross-section in their centre portion and a right angle projection 36 on one side.

Each successive arched element is fastened to the track belts in such a manner as to provide projections 36 on alternate sides of the track, Thus additional gripping action is obtained without sacrificing the stability of the system.

The front section 21 of the vehicle, hinged to the platform 20 at 37, is checked in its downward movement by means of a shock absorber. This shock absorber comprises a cylinder 38 hinged at its head to a bracket 39 fastened to the underside of the platform 20. A piston 40 is slidable inside said cylinder being checked in its inward movement by a coil spring 41 inside said cylinder, whilst the outward movement of said piston is limited by a chain 42 located inside said coil spring and fastened to said piston and to the cylinder head.

The piston 40 is secured to the piston rod 43 having its free end hingedly connected to one of a pair of angle brackets 44 fastened to the underside of the front section 21 of the vehicle.

It is apparent that this shock absorber can take a great amount of punishment specially when the skis are lifted by an obstacle because the chain is a much stronger stop than the flange 45 at the free end of the cylinder. The cylinder itself may be of much lighter construction being exposed to relatively small stresses.

The skis 22 are maintained in parallel position by being pivoted at the bolts 46' to the ends of two parallel cross-beams 46 of equal length. The rear cross-beam 46 is attached to the section 21 by means of a central vertical pin 47 secured to the rear cross-beam and pivoted to a flexible U-shaped element 48 preferably made of rubber or leather and pivoted to the brackets 44 by means of rivets 47a. Element 48 provides a flexible universal link between the skis and the vehicle for easier going over a rough terrain.

The skis are turned about bolts 46' under the action of two steering handles 49 pivoted on pivot 49' for vertical arcuate movement at the free ends of a pair of parallel tubes 50 secured to the platform 20. These handles are suitably spaced from the driver's seat for easy reach.

Each driving handle has a projection 51 connected to the opposite ski by means of flexible cables 52. These cables are slidable inside the tubes 50 and inside further conduits 53 fastened to the section 21, and finally pass through suitable holes in said section for attachment to the front portion of the skis. Flexible tubes 54 connect the tubes 50 and the conduits 53 at the hinge 37.

From the foregoing arrangement, it is apparent that the skis turn towards the side of the handle which is lifted and moreover, the cables 52 will exert a pull substantially at right angles to the skis 22 during their turning movement, as shown in Figure 14, thereby minimizing the pull necessary at the handles 49 without sacrificing to the speed of the turning operation. It should be noted that the turning movement of the skis 22 will be limited by the pivotal movement of the steering handles 49 about their pivot 49'. Normally the skis 22 will not turn about the central pin 47.

Referring to Figure 10, it is seen that the skis are maintained in their upright position by a reinforcing angle plate 55 secured to the inside face of the ski and in slidable contact with the cross-beams 46.

As shown in Figure 8, the skis have a T-shaped cross-section and, for better directing action, they are provided with longitudinal guide tubes 56 secured to their running face.

The tension of the tracks is made adjustable by means of the arrangement best shown in Figure 9. The ends of the front wheel axle 30' pass through a longitudinal slot 57 made in the wheel supporting beams 31, and are adjustably secured by means of the eye-bolts 58 retained by the nuts 59.

From the above description, it is apparent that this snowmobile may be substituted for sleigh dogs of the type actually used for pulling sleighs in the northern areas. This vehicle will negotiate the most difficult terrain whilst it may attain speeds comparable to those of an automobile on a highway, when riding over flat grounds.

Because the power take-off comprises only the sprocket wheel 25 and its associated driving chain, the spacing of the tracks may be made very small indeed, leaving no possibility of the snow piling under the vehicle as so often occurs with standard snowmobiles.

While a preferred embodiment of the invention has been shown and described, it is understood that various modifications of the elements may be resorted to without departing from the spirit and scope of the appended claims.

Having thus described my invention, I claim:

1. In a snowmobile having a chassis, steering means comprising a pair of parallel skis, two spaced parallel cross-beams pivotally mounted at their ends on the middle portion of said skis, a pin projecting from the middle portion of the rear cross-beam, a flexible U-shaped member secured at its free ends to the underside of said chassis, said pin connected to said flexible member thereby providing the only attachment between said chassis and said skis, a pair of steering handles, a pair of supporting members for said handles mounted on said chassis and to which said handles are hingedly connected for vertical arcuate movement, a projection on said handles and cables connecting said projections of said handles to the opposite skis forwardly of said cross-beams, so that the skis will turn towards the side of the handle being pulled.

2. In a snowmobile having a chassis steering means comprising a pair of parallel skis, two spaced parallel cross-beams pivotally mounted at their ends on the middle portion of said skis, a pin projecting from the middle portion of the rear cross-beam, a frame section hingedly mounted for vertical arcuate movement at the front of said chassis, a flexible U-shaped member secured at its free ends to the underside of said frame section, said pin connected to said flexible member thereby providing the only attachment between said chassis and said skis, a pair of steering handles, a pair of supporting members for said handles mounted on said chassis and to which said handles are hingedly connected for vertical arcuate movement, a projection on said handles, and cables connecting said projections of said handles to the opposite skis forwardly of said cross-beams.

JOSEPH WILFRID GRENIER.

REFERENCES CITED

The following references are of record in the file of this patent:

UNITED STATES PATENTS

| Number | Name | Date |
| --- | --- | --- |
| 1,001,113 | Yach | Aug. 22, 1911 |
| 1,075,465 | Denney | Oct. 14, 1913 |
| 1,223,210 | Smith | Apr. 17, 1917 |
| 1,267,385 | Crooks | May 28, 1918 |
| 1,530,223 | Young | Mar. 17, 1925 |
| 2,419,522 | Acton | Apr. 29, 1947 |